United States Patent
McAllister et al.

(10) Patent No.: US 12,204,468 B1
(45) Date of Patent: Jan. 21, 2025

(54) UNIVERSAL MEMORY INTERFACE WITH DYNAMIC BIDIRECTIONAL DATA TRANSFERS

(71) Applicant: Eliyan Corporation, Santa Clara, CA (US)

(72) Inventors: Curtis McAllister, Los Altos, CA (US); Syrus Ziai, Los Altos, CA (US)

(73) Assignee: Eliyan Corporation, Santa Clara, CA (US)

( * ) Notice: Subject to any disclaimer, the term of this patent is extended or adjusted under 35 U.S.C. 154(b) by 0 days.

(21) Appl. No.: 18/652,707

(22) Filed: May 1, 2024

Related U.S. Application Data

(60) Provisional application No. 63/543,517, filed on Oct. 11, 2023.

(51) Int. Cl.
  G06F 13/16       (2006.01)

(52) U.S. Cl.
  CPC .......... G06F 13/16 (2013.01); *G06F 2213/16* (2013.01)

(58) Field of Classification Search
  CPC .............................. G06F 13/16; G06F 2213/16
  See application file for complete search history.

(56) References Cited

U.S. PATENT DOCUMENTS

| | | | |
|---|---|---|---|
| 4,334,305 A | 6/1982 | Girardi | |
| 5,396,581 A | 3/1995 | Mashiko | |
| 5,677,569 A | 10/1997 | Choi | |
| 5,892,287 A | 4/1999 | Hoffman | |
| 5,910,010 A | 6/1999 | Nishizawa | |
| 6,031,729 A | 2/2000 | Berkely | |
| 6,055,235 A | 4/2000 | Blanc | |
| 6,417,737 B1 | 7/2002 | Moloudi | |
| 6,492,727 B2 | 12/2002 | Nishizawa | |
| 6,690,742 B2 | 2/2004 | Chan | |
| 6,721,313 B1 | 4/2004 | Van Duyne | |
| 6,932,618 B1 | 8/2005 | Nelson | |
| 7,027,529 B1 | 4/2006 | Ohishi | |
| 7,248,890 B1 | 7/2007 | Raghavan | |
| 7,269,212 B1 | 9/2007 | Chau | |
| 7,477,615 B2 | 1/2009 | Oshita | |
| 7,535,958 B2 | 5/2009 | Best | |
| 7,593,271 B2 | 9/2009 | Ong | |

(Continued)

OTHER PUBLICATIONS

Block Memory Generator v8.2 LogiCORE IP Product Guide Vivado Design Suite; Xilinx; Apr. 1, 2015.

(Continued)

*Primary Examiner* — Henry Tsai
*Assistant Examiner* — Christopher A Daley
(74) *Attorney, Agent, or Firm* — Lance Kreisman; Peninsula Patent Group

(57) ABSTRACT

Semiconductor devices, packaging architectures and associated methods are disclosed. In one embodiment, a memory chiplet is disclosed. The memory chiplet includes at least one memory die of a first memory type. Memory control circuitry is coupled to the at least one memory die. An interface circuit is for coupling to a host IC chiplet. The interface circuit includes data input/output (I/O) circuitry for coupling to multiple data lanes. Link directional control circuitry selects, for a first memory transaction, a first subset of the multiple data lanes to transfer data between the memory chiplet and the host IC chiplet.

20 Claims, 5 Drawing Sheets

(56) References Cited

U.S. PATENT DOCUMENTS

| | | |
|---|---|---|
| 7,701,957 B1 | 4/2010 | Bicknell |
| 7,907,469 B2 | 3/2011 | Sohn et al. |
| 7,978,754 B2 | 7/2011 | Yeung |
| 8,004,330 B1 | 8/2011 | Acimovic |
| 8,024,142 B1 | 9/2011 | Gagnon |
| 8,121,541 B2 | 2/2012 | Rofougaran |
| 8,176,238 B2 | 5/2012 | Yu et al. |
| 8,468,381 B2 | 6/2013 | Jones |
| 8,483,579 B2 | 7/2013 | Fukuda |
| 8,546,955 B1 | 10/2013 | Wu |
| 8,704,364 B2 | 4/2014 | Banijamali et al. |
| 8,861,573 B2 | 10/2014 | Chu |
| 8,948,203 B1 | 2/2015 | Nolan |
| 8,982,905 B2 | 3/2015 | Kamble |
| 9,088,334 B2 | 7/2015 | Chakraborty |
| 9,106,229 B1* | 8/2015 | Hutton ............... H01L 25/105 |
| 9,129,935 B1 | 9/2015 | Chandrasekar |
| 9,294,313 B2 | 3/2016 | Prokop |
| 9,349,707 B1 | 5/2016 | Sun |
| 9,379,878 B1 | 6/2016 | Lugthart |
| 9,432,298 B1 | 8/2016 | Smith |
| 9,558,143 B2 | 1/2017 | Leidel |
| 9,832,006 B1 | 11/2017 | Bandi |
| 9,842,784 B2 | 12/2017 | Nasrullah |
| 9,886,275 B1 | 2/2018 | Carlson |
| 9,934,842 B2 | 4/2018 | Mozak |
| 9,961,812 B2 | 5/2018 | Suorsa |
| 9,977,731 B2 | 5/2018 | Pyeon |
| 10,171,115 B1 | 1/2019 | Shirinfar |
| 10,402,363 B2 | 9/2019 | Long et al. |
| 10,410,694 B1* | 9/2019 | Arbel ................. G06F 3/0658 |
| 10,439,661 B1 | 10/2019 | Heydari |
| 10,642,767 B1* | 5/2020 | Farjadrad ............ G06F 13/36 |
| 10,678,738 B2 | 6/2020 | Dai |
| 10,735,176 B1 | 8/2020 | Heydari |
| 10,748,852 B1 | 8/2020 | Sauter |
| 10,803,548 B2 | 10/2020 | Matam et al. |
| 10,804,204 B2 | 10/2020 | Rubin et al. |
| 10,825,496 B2 | 11/2020 | Murphy |
| 10,855,498 B1 | 12/2020 | Farjadrad |
| 10,935,593 B2 | 3/2021 | Goyal |
| 11,088,876 B1* | 8/2021 | Farjadrad ........... H04L 25/0298 |
| 11,100,028 B1* | 8/2021 | Subramaniam ..... G06F 13/4221 |
| 11,164,817 B2 | 11/2021 | Rubin et al. |
| 11,204,863 B2 | 12/2021 | Sheffler |
| 11,581,282 B2 | 2/2023 | Elshirbini |
| 11,669,474 B1 | 6/2023 | Lee |
| 11,789,649 B2 | 10/2023 | Chatterjee et al. |
| 11,841,815 B1 | 12/2023 | Farjadrad |
| 11,842,986 B1 | 12/2023 | Ramin |
| 11,855,043 B1 | 12/2023 | Farjadrad |
| 11,855,056 B1 | 12/2023 | Rad |
| 11,892,242 B2* | 2/2024 | Mao ................. F28D 15/0275 |
| 11,893,242 B1* | 2/2024 | Farjadrad ............. H01L 25/16 |
| 11,983,125 B2 | 5/2024 | Soni |
| 12,001,355 B1 | 6/2024 | Dreier |
| 2002/0122479 A1 | 9/2002 | Agazzi |
| 2002/0136315 A1 | 9/2002 | Chan |
| 2004/0088444 A1 | 5/2004 | Baumer |
| 2004/0113239 A1 | 6/2004 | Prokofiev |
| 2004/0130347 A1 | 7/2004 | Moll |
| 2004/0156461 A1 | 8/2004 | Agazzi |
| 2005/0041683 A1 | 2/2005 | Kizer |
| 2005/0134306 A1 | 6/2005 | Stojanovic |
| 2005/0157781 A1 | 7/2005 | Ho |
| 2005/0205983 A1 | 9/2005 | Origasa |
| 2006/0060376 A1 | 3/2006 | Yoon |
| 2006/0103011 A1 | 5/2006 | Andry |
| 2006/0158229 A1 | 7/2006 | Hsu |
| 2006/0181283 A1 | 8/2006 | Wajcer |
| 2006/0188043 A1 | 8/2006 | Zerbe |
| 2006/0250985 A1 | 11/2006 | Baumer |
| 2006/0251194 A1 | 11/2006 | Bublil |
| 2007/0281643 A1 | 12/2007 | Kawai |
| 2008/0063395 A1 | 3/2008 | Royle |
| 2008/0143422 A1 | 6/2008 | Lalithambika |
| 2008/0186987 A1 | 8/2008 | Baumer |
| 2008/0222407 A1 | 9/2008 | Carpenter |
| 2009/0113158 A1 | 4/2009 | Schnell |
| 2009/0154365 A1 | 6/2009 | Diab |
| 2009/0174448 A1 | 7/2009 | Zabinski |
| 2009/0220240 A1 | 9/2009 | Abhari |
| 2009/0225900 A1 | 9/2009 | Yamaguchi |
| 2009/0304054 A1 | 12/2009 | Tonietto |
| 2010/0177841 A1 | 7/2010 | Yoon |
| 2010/0197231 A1 | 8/2010 | Kenington |
| 2010/0294547 A1 | 11/2010 | Hatanaka |
| 2011/0029803 A1 | 2/2011 | Redman-White |
| 2011/0038286 A1 | 2/2011 | Ta |
| 2011/0167297 A1 | 7/2011 | Su |
| 2011/0187430 A1 | 8/2011 | Tang |
| 2011/0204428 A1 | 8/2011 | Erickson |
| 2011/0267073 A1 | 11/2011 | Chengson |
| 2011/0293041 A1 | 12/2011 | Luo |
| 2012/0082194 A1 | 4/2012 | Tam |
| 2012/0182776 A1 | 7/2012 | Best |
| 2012/0192023 A1 | 7/2012 | Lee |
| 2012/0216084 A1 | 8/2012 | Chun |
| 2012/0327818 A1 | 12/2012 | Takatori |
| 2013/0181257 A1* | 7/2013 | Ngai ................ H01L 25/0657 257/209 |
| 2013/0222026 A1 | 8/2013 | Havens |
| 2013/0249290 A1 | 9/2013 | Buonpane |
| 2013/0285584 A1 | 10/2013 | Kim |
| 2014/0016524 A1 | 1/2014 | Choi |
| 2014/0048947 A1 | 2/2014 | Lee |
| 2014/0126613 A1 | 5/2014 | Zhang |
| 2014/0192583 A1 | 7/2014 | Rajan |
| 2014/0269860 A1 | 9/2014 | Brown |
| 2014/0269983 A1 | 9/2014 | Baeckler |
| 2015/0012677 A1 | 1/2015 | Nagarajan |
| 2015/0172040 A1 | 6/2015 | Pelekhaty |
| 2015/0180760 A1 | 6/2015 | Rickard |
| 2015/0206867 A1 | 7/2015 | Lim |
| 2015/0271074 A1 | 9/2015 | Hirth |
| 2015/0326348 A1 | 11/2015 | Shen |
| 2015/0358005 A1 | 12/2015 | Chen |
| 2016/0056125 A1 | 2/2016 | Pan |
| 2016/0071818 A1 | 3/2016 | Wang |
| 2016/0111406 A1 | 4/2016 | Mak |
| 2016/0217872 A1 | 7/2016 | Hossain |
| 2016/0294585 A1 | 10/2016 | Rahman |
| 2017/0317859 A1 | 11/2017 | Hormati |
| 2017/0331651 A1 | 11/2017 | Suzuki |
| 2018/0010329 A1 | 1/2018 | Golding, Jr. |
| 2018/0082981 A1 | 3/2018 | Gowda |
| 2018/0137005 A1 | 5/2018 | Wu |
| 2018/0175001 A1 | 6/2018 | Pyo |
| 2018/0190635 A1 | 7/2018 | Choi |
| 2018/0210830 A1 | 7/2018 | Malladi et al. |
| 2018/0315735 A1* | 11/2018 | Delacruz ............. H01L 25/16 |
| 2019/0044764 A1 | 2/2019 | Hollis |
| 2019/0058457 A1 | 2/2019 | Ran |
| 2019/0108111 A1 | 4/2019 | Levin |
| 2019/0198489 A1 | 6/2019 | Kim |
| 2019/0319626 A1* | 10/2019 | Dabral .............. H01L 25/0652 |
| 2020/0051961 A1* | 2/2020 | Rickard ........... H01L 23/49822 |
| 2020/0105718 A1 | 4/2020 | Collins et al. |
| 2020/0257619 A1 | 8/2020 | Sheffler |
| 2020/0373286 A1 | 11/2020 | Dennis |
| 2021/0056058 A1 | 2/2021 | Lee |
| 2021/0082875 A1 | 3/2021 | Nelson |
| 2021/0117102 A1 | 4/2021 | Grenier |
| 2021/0181974 A1 | 6/2021 | Ghosh |
| 2021/0183842 A1 | 6/2021 | Fay |
| 2021/0193567 A1 | 6/2021 | Cheah et al. |
| 2021/0225827 A1 | 7/2021 | Lanka |
| 2021/0258078 A1 | 8/2021 | Meade |
| 2021/0311900 A1 | 10/2021 | Malladi |
| 2021/0365203 A1 | 11/2021 | O |
| 2022/0051989 A1 | 2/2022 | Agarwal |
| 2022/0121381 A1 | 4/2022 | Brewer |
| 2022/0159860 A1 | 5/2022 | Winzer |
| 2022/0179792 A1 | 6/2022 | Banerjee |

(56) References Cited

U.S. PATENT DOCUMENTS

| | | | |
|---|---|---|---|
| 2022/0222198 | A1 | 7/2022 | Lanka |
| 2022/0223522 | A1 | 7/2022 | Scearce |
| 2022/0237138 | A1 | 7/2022 | Lanka |
| 2022/0254390 | A1 | 8/2022 | Gans |
| 2022/0327276 | A1 | 10/2022 | Seshan |
| 2022/0334995 | A1 | 10/2022 | Das Sharma |
| 2022/0342840 | A1 | 10/2022 | Das Sharma |
| 2023/0039033 | A1 | 2/2023 | Zarkovsky |
| 2023/0068802 | A1 | 3/2023 | Wang |
| 2023/0090061 | A1 | 3/2023 | Zarkovsky |
| 2023/0181599 | A1 | 5/2023 | Erickson |
| 2023/0359579 | A1 | 11/2023 | Madhira |
| 2024/0273041 | A1 | 8/2024 | Lee |

OTHER PUBLICATIONS

Farjadrad et al., "A Bunch of Wires (BOW) Interface for Inter-Chiplet Communication", 2019 IEEE Symposium on High-Performance Interconnects (HOTI), pp. 27-30, Oct. 2019.

Universal Chiplet Interconnect Express (UCIe) Specification Rev. 1.0, Feb. 24, 2022.

Kurt Lender et al., "Questions from the Compute Express Link Exploring Coherent Memory and Innovative Cases Webinar", Apr. 13, 2020, CXL Consortium, pp. 1-6.

Planet Analog, "The basics of SerDes (serializers/deserializers) for interfacing", Dec. 1, 2020, Planet Analog, as preserved by the internet Archive, pp. 1-9.

"Hot Chips 2017: Intel Deep Dives Into EMIB", TomsHardware.com; Aug. 25, 2017.

"Using Chiplet Encapsulation Technology to Achieve Processing-In-Memory Functions"; Micromachines 2022, 13, 1790; https://www.mdpi.com/journal/micromachines; Tian et al.

"Multiport memory for high-speed interprocessor communication in MultiCom;" Scientia Iranica, vol. 8, No. 4, pp. 322-331; Sharif University of Technology, Oct. 2001; Asgari et al.

Universal Chiplet Interconnect Express (UCIe) Specification, Revision 1.1, Version 1.0, Jul. 10, 2023.

Hybrid Memory Cube Specification 2.1, Hybrid Memory Cube Consortium, HMC-30G-VSR PHY, 2014.

"Using Dual Port Memory as Interconnect", EE Times, Apr. 26, 2005, Daniel Barry.

Quartus II Handbook Version 9.0 vol. 4: SOPC Builder; "System Interconnect Fabric for Memory-Mapped Interfaces"; Mar. 2009.

\* cited by examiner

FIG. 1 [DYNAMIC BIDI W/ DATA1 AND DATA2]

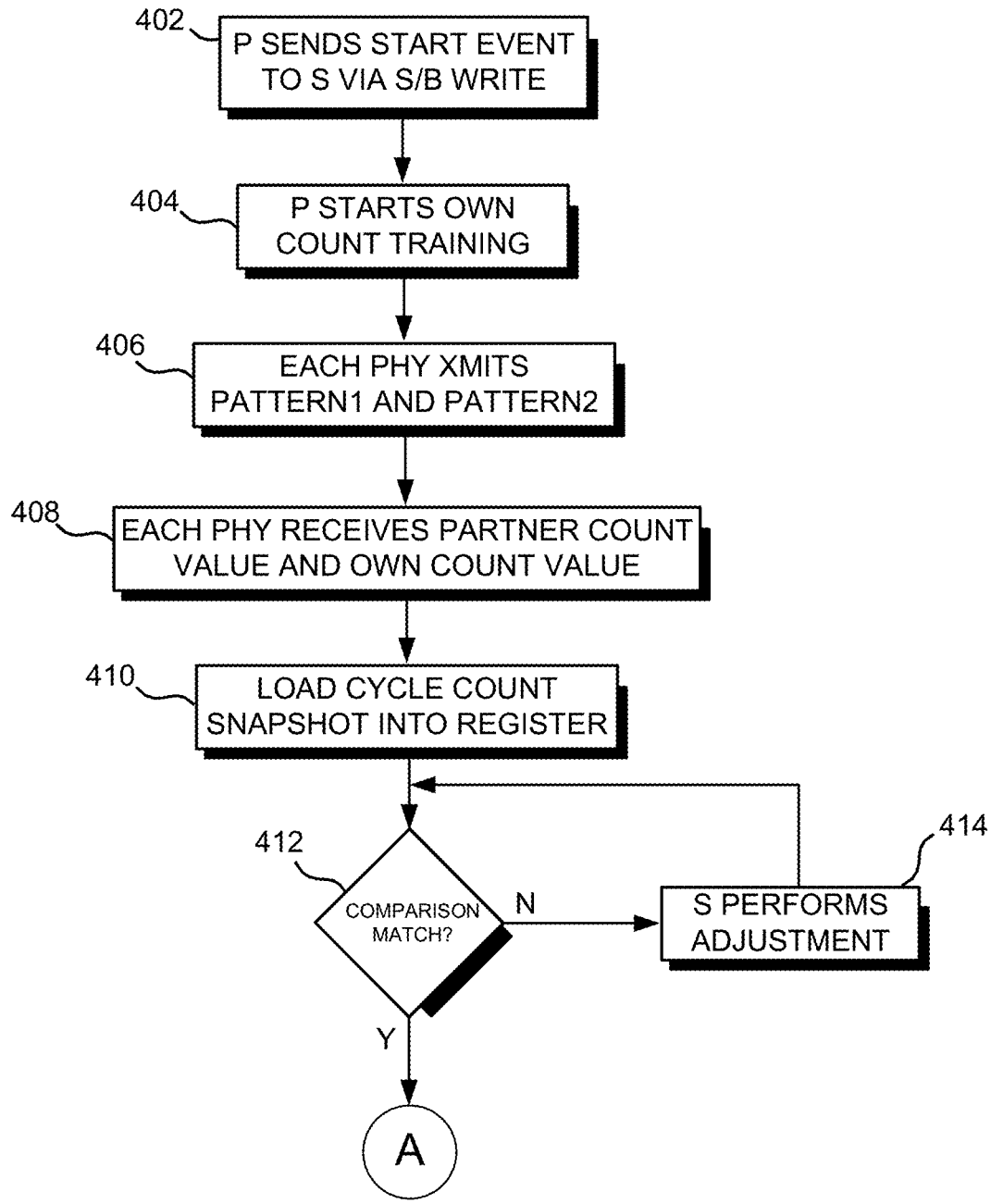

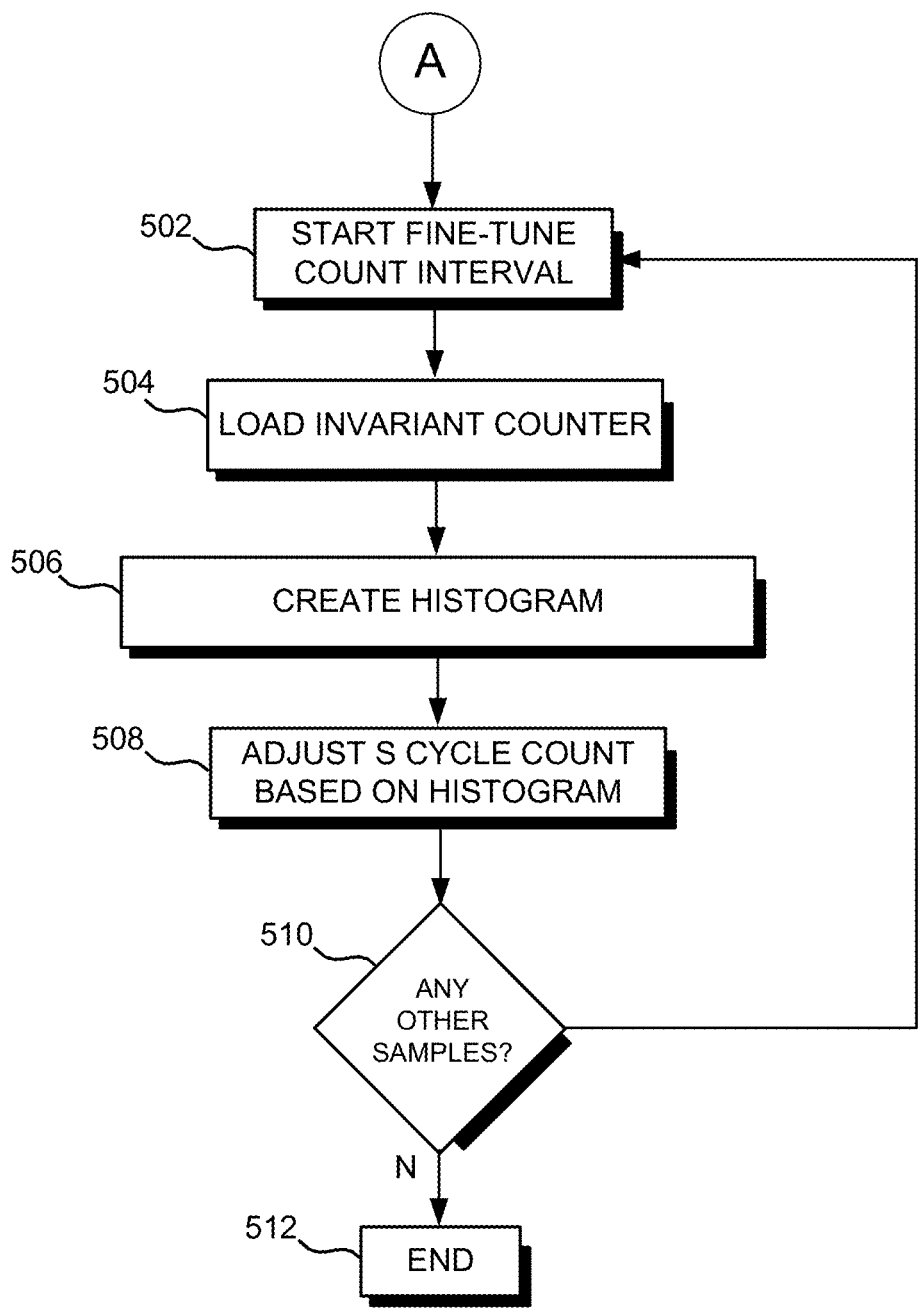

UNIVERSAL MEMORY INTERFACE WITH DYNAMIC BIDIRECTIONAL DATA TRANSFERS

CROSS-REFERENCE TO RELATED APPLICATIONS

This application is a Non-Provisional that claims priority to U.S. Provisional Application No. 63/543,517, filed Oct. 11, 2023, titled "UNIVERSAL MEMORY INTERFACE (UMI) WITH HALF-DUPLEX BIDIRECTIONAL D2D & C2C PHYS FOR PACKET-BASED MEMORY TRAFFIC TRANSFER", which is incorporated herein by reference in its entirety.

TECHNICAL FIELD

The disclosure herein relates to semiconductor devices, packaging and associated methods.

BACKGROUND

As integrated circuit (IC) chips such as system on chips (SoCs) become larger, the yields realized in manufacturing the chips become smaller. Decreasing yields for larger chips increases overall costs for chip manufacturers. To address the yield problem, chiplet architectures have been proposed that favor a modular approach to SoCs. The solution employs smaller sub-processing chips, each containing a well-defined subset of functionality. Chiplets thus allow for dividing a complex design, such as a high-end processor or networking chip, into several small die instead of one large monolithic die.

When accessing memory, traditional chiplet architectures often employ relatively large and complex die-to-die (D2D) interfaces for transferring data between the chiplet and a specific memory type. While beneficial in certain circumstances, many conventional D2D interfaces are typically designed to support a variety of applications. Using generic interfaces specifically for memory applications in a chiplet context is often non-optimal, with sacrifices in latency and power efficiency often made in the interests of wider interface applicability.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 4 illustrates one embodiment of steps employed in a coarse training sequence for the common clock logic of FIG. 3.

FIG. 5 illustrates one embodiment of steps employed in a fine training sequence for the common clock logic of FIG. 3.

DETAILED DESCRIPTION

Semiconductor devices, packaging architectures and associated methods are disclosed. In one embodiment, a memory chiplet is disclosed. The memory chiplet includes at least one memory die of a first memory type. Memory control circuitry is coupled to the at least one memory die. An interface circuit is for coupling to a host IC chiplet. The interface circuit includes data input/output (I/O) circuitry for coupling to multiple data lanes. Link directional control circuitry selects, for a first memory transaction, a first subset of the multiple data lanes to transfer data between the memory chiplet and the host IC chiplet. By providing link directional control capability, such that multiple groups of links can change directions independently, arbitration efficiencies may be improved as compared to fixed link mapping.

Throughout the disclosure provided herein, the term multi-chip module (MCM) is used to represent a semiconductor device that incorporates multiple semiconductor die or sub-packages in a single unitary package. An MCM may also be referred to as a system in a package (SiP). The die or sub-packages are referred to herein as chiplets. The die or sub-packages that are interconnected in an MCM or SiP are referred to herein as chiplets. Packaged die that are disposed external to an MCM or SiP, such as being mounted on a printed circuit board (PCB), are referred to herein as chips.

Figure 1:
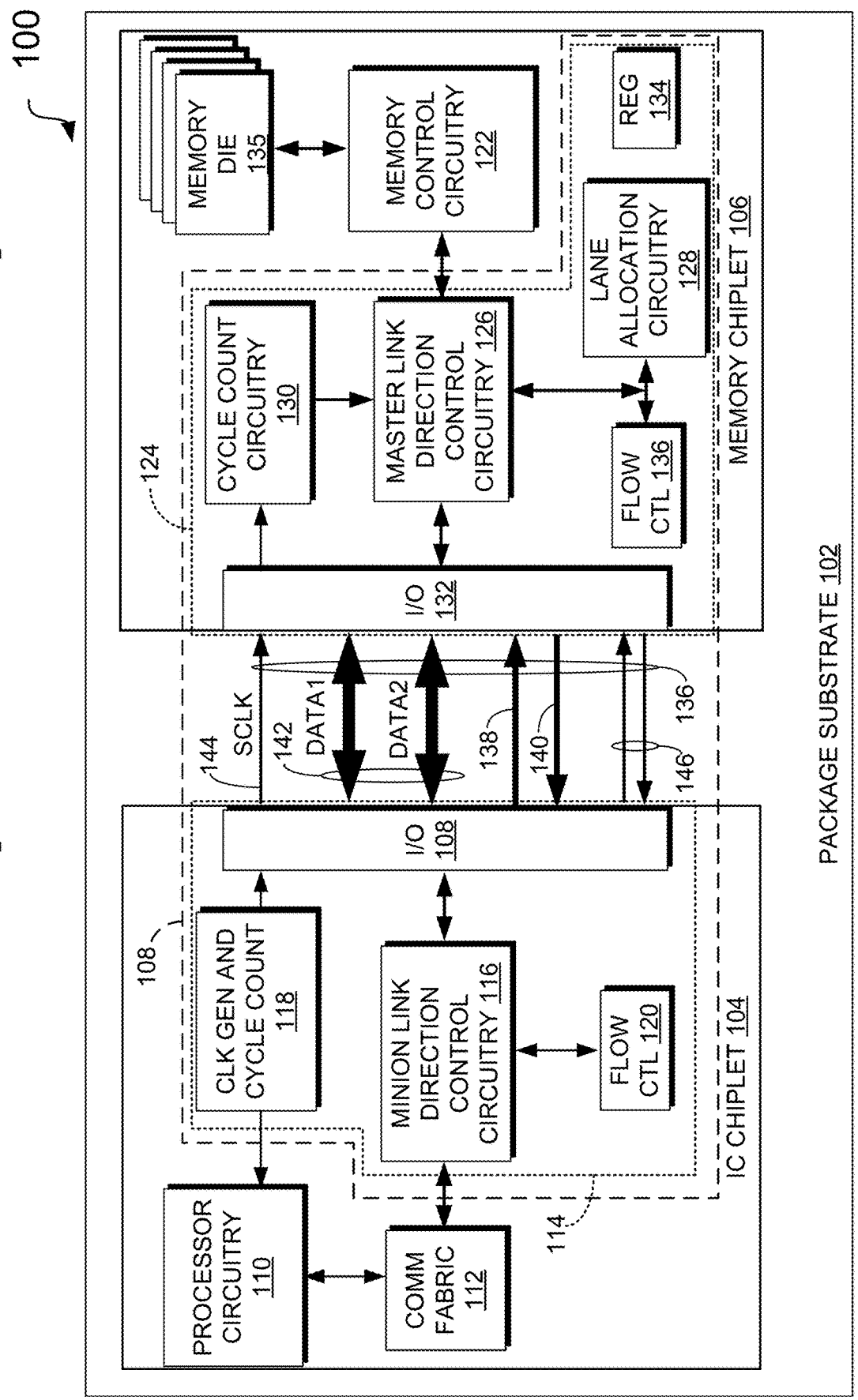
FIG. 1 illustrates a high-level top plan view of a multi-chip module (MCM), including a first integrated circuit (IC) chiplet that is coupled to a memory chiplet via a universal memory interface (UMI).

FIG. 1 illustrates one embodiment of an MCM, generally designated 100, that employs a package substrate 102 for mounting a host integrated circuit (IC) chiplet 104 and a memory chiplet 106. An interface circuit 108 provides a low-latency and arbitration-efficient communications protocol between the host IC chiplet 104 and the memory chiplet 106. For one embodiment, the interface circuit 108 is packet-based and operates via a packet protocol. As explained in further detail below, embodiments of the communications protocol described herein enhances memory transaction efficiency while reducing power consumption.

Further referring to FIG. 1, the package substrate 102 may take a variety of forms, depending on the application. For some embodiments, the package substrate 102 may be realized as a "standard" package substrate, formed with an organic non-silicon material and incorporating a relatively sparse trace density appropriate for standard ball grid array (BGA) contact arrays (such as on the order of approximately one hundred to one hundred fifty microns). In other embodiments, the package substrate 102 may take the form of an "advanced" package substrate, such as a silicon interposer or silicon bridge-based substrate that provides a trace density on the order of approximately twenty-five to fifty-five microns.

With continued reference to FIG. 1, the host IC chiplet 104 generally includes processor circuitry 110 or other logic that performs operations on data, with the need to periodically carry out read and write data transfers with the memory chiplet 106. The processor circuitry 110 may take the form of one or more processors such as a computer processing unit (CPU), graphics processing unit (GPU), tensor processing unit (TPU), artificial intelligence (AI) processing circuitry, field-programmable gate array (FPGA) circuitry or other form of host chiplet with a need to access memory.

Further referring to FIG. 1, the first IC chiplet 104 includes a communications fabric 112 for controlling communications on-chip, but for also controlling how the first IC chiplet 104 communicates off-chip with other chiplets, such as the memory chiplet 106. For one embodiment, the communications fabric 112 includes network-on-chip (NoC) circuitry, such as that disclosed in U.S. patent Ser. No. 18/528,702, filed Dec. 4, 2023, titled: "UNIVERSAL NETWORK-ATTACHED MEMORY ARCHITECTURE", owned by the assignee of the instant application and expressly incorporated herein by reference.

With continued reference to FIG. 1, the IC chiplet 104 includes a "primary" interface sub-circuit 114 that forms a portion of the overall interface 108. For one embodiment, the primary interface sub-circuit 114 includes minion link directional control circuitry 116 to control a selection of lanes for data transmission between the IC chiplet 104 and the memory chiplet 106. As explained more fully below, lane selection may be based on a variety of factors, including data prioritization, relative flow control between read and write pipelines, and other criteria. Clock generation and cycle count circuitry 118 provides a system clock signal SCLK to serve as a forwarded clock to synchronize overall timing throughout the interface 108, as well as providing a cycle count for dynamic bidirectional switching synchronization. Flow control circuitry 120 provides traffic regulation at the host IC chiplet 104 end to maximize data pipeline efficiencies. Further details pertaining to each of the above features of the primary interface sub-circuit 114 are more fully described below.

Further referring to FIG. 1, for one embodiment, the memory IC chiplet 106 includes memory control circuitry 122 for controlling the scheduling of memory transactions between the host IC chiplet 104 and memory of a specific standard or type, such as high-bandwidth memory (HBM), double-data rate (DDR) memory, low-power double data rate (LPDDR), graphics double data rate (GDDR), to name but a few. Positioning the memory control circuitry 122 on the memory chiplet 106 removes the need for the host IC chiplet 104 (often a costly application-specific integrated circuit) to know the type of memory being accessed. The memory-agnostic feature of the primary interface sub-circuit 114 allows the host IC chiplet 104 to be paired with a variety of memory types, hence taking the form of a universally applicable memory interface (UMI).

For one embodiment, the memory chiplet 106 includes a second portion of the interface 108, referred to herein as a "secondary" interface sub-circuit 124. For one embodiment, the secondary interface subcircuit 124 includes master link directional control circuitry 126, lane allocation circuitry 128, cycle count circuitry 130 and I/O circuitry 132. In some embodiments, register storage 134 may be provided on the memory chiplet 106 to store configurable parameters, such as turnaround time, relating to bidirectional link control, among other things. A memory chiplet-side flow control circuit 136 cooperates with the host IC chiplet-side flow control circuit 120 and provides traffic regulation at the memory IC chiplet 104 end to maximize data pipeline efficiencies.

For some embodiments, the memory chiplet 106 may take the form of a single-die chiplet that includes the memory control circuitry 122 and the features of the secondary interface sub-circuit 124. The single-die chiplet may then be employed as a base die upon which are stacked memory die 135 for a stacked memory implementation, such as for HBM. Other embodiments may employ the single die as a buffer or intermediary between the IC chiplet 104 and memory die disposed proximate the single die on the package substrate 102 or off-MCM (not shown).

For one embodiment, the I/O circuitry 108 of the host IC chiplet 104 connects to the I/O circuitry 132 of the memory chiplet 106 via multiple lanes 136. For one embodiment, the multiple lanes 136 are configured (from the perspective of the IC chiplet 104) with memory transactions in mind to employ and utilize memory-centric features and functionality, thereby reducing latency and power consumption that might otherwise result from use of a generic D2D interface designed for a wide range of applications. For one embodiment, the multiple lanes 136 are configured or partitioned (from the perspective of the primary interface sub-circuit 114) into an egress link 138, an ingress link 140, a data link 142 and a forwarding clock link 144. For one specific embodiment, the data link 142 may be partitioned into multiple data links DATA1 and DATA2. For some embodiments, a bidirectional sideband link 146 may be employed for out-of-band communications. Further details regarding specific embodiments of the multiple lanes 136 are disclosed in copending U.S. patent application Ser. No. 18/652,675, filed May 1, 2024, titled "UNIVERSAL MEMORY INTERFACE", owned by the assignee of the instant application and expressly incorporated herein by reference.

Further referring to FIG. 1, and as noted above, for one specific embodiment, the partitioned data link 142 takes the form of two subsets of bidirectional data lanes DATA1 and DATA2. Each subset of bidirectional data lanes includes a number of lanes sufficient to transfer a sixty-four byte cacheline of data within an acceptable turnaround time constraint. One implementation utilizes thirty-seven lanes for each subset of bidirectional data lines for transferring the sixty-four byte cacheline of data. The time interval required to transfer the cacheline of data is referred to herein as a slot in the data link. Rather than assigning the subsets of bidirectional data lanes DATA1 and DATA2 to a fixed lane mapping (such as having one set operate only in a write direction, and the other set operate only in a read direction), the two subsets of lanes are individually dynamically configurable by the master link direction control circuitry 126 during operation to, as an example only, transfer a first cacheline of data (such as read data) in one direction, and subsequently transfer a second cacheline of data (such as write data) in the opposite direction. Dynamically configuring the subsets of bidirectional data lanes DATA1 and DATA2 in a memory-centric manner allows for arbitration efficiencies that typically exceed those of fixed lane mapping.

In an effort to maximize the arbitration efficiency involved in communications between the IC chiplet 104 and the memory chiplet 106, the minion link directional control circuitry 116 of the "primary" interface sub-circuit 114 and the master link directional control circuitry 126 of the "secondary" interface sub-circuit 124 are configured to cooperate in selecting between the subset of lanes DATA1 and DATA2 for a given memory operation based on a variety of factors. For one embodiment, the secondary interface sub-circuit 124 is configured as the default owner of the bidirectional data links DATA1 and DATA2. Being positioned on the memory chiplet 106, the secondary interface sub-circuit 124 is closer to the memory 135 and the memory control circuitry 122 than any circuitry of the host IC chiplet 104. This allows fast access to link availability information involving, for example, a read data pipeline in the memory chiplet 104, and specifically information regarding when read operations have been scheduled by the memory control circuitry 122, and thus when read data is available to traverse one or more of the data links DATA1 and DATA2. The proximity also drastically lowers the area and power needed to add dedicated control signals between the Memory Control Circuitry 122 and the Master Link Direction Control Circuitry 126. This proximity to the read pipeline information reduces any latency and area penalty that may be involved in obtaining the read operation information.

As explained above, with the read pipeline information readily available and in close proximity, for one embodiment, the master link directional control circuitry 126 on the memory chiplet 106 uses the link availability information as at least one factor in selecting from which of the two subsets of bidirectional data lanes DATA1 or DATA2 to use for a given write operation or read operation. In addition to read pipeline information, the master link directional control circuitry 126 may track the difference between write requests received and write data received to determine the number of outstanding write data transfers. It can then use this information to optimize how aggressively it allocates slots for write data transfers.

For some embodiments, selecting between the two subsets of bidirectional data lanes DATA1 or DATA2 to use for a given write operation or read operation may be achieved in a variety of ways. For one specific embodiment, the link direction is controlled by "link availability" information generated by the master link direction control circuitry 126 and specified in a field of a response packet, which is issued from the memory chiplet 106 by the "secondary" interface sub-circuit 124 for transfer along the ingress link 140 to the host IC chiplet 104. Regardless of the implementation employed, an optimization between link bandwidth utilization versus read latency should be observed. For instance, based upon memory scheduling alone there may not be open timing intervals in the read pipeline that are large enough to allow for write data transfers, or the open timing intervals might not be large enough to minimize bandwidth lost to turnaround cycles. In these cases, the master link directional control circuitry 126 may need to temporarily delay some read data returns to allow for better link utilization and to prevent a large number of write data transactions from being queued in chiplet 104. The queing of write data transactions should be limited to avoid two possible negative performance effects: (a) if the write data queues are ever filled, processing in chiplet 104 must be stopped to prevent overflow, and (b) read after write conflict logic often requires writes to be flushed to the DRAM so a conflicting read may need to wait for a long time if the offending write data hasn't already been transferred to chiplet 106.

In addition to specifying link availability information, for one embodiment, response packets that control link direction also specify a clock synchronization parameter referred to herein as a cycle count. The cycle count represents a count of the system clock cycles at a given timing instant and at a given location in the system. For one specific embodiment, and described more fully below, the cycle count is generated by the cycle count circuitry 130 of the memory chiplet 104, thus providing a common timing reference point for both chiplets. Distributing the cycle count so that it is known by both the primary interface sub-circuit 114 and the secondary interface sub-circuit 124 allows for performing synchronized operations across the link, particularly those involving bidirectional bus direction switchovers.

Figure 2:
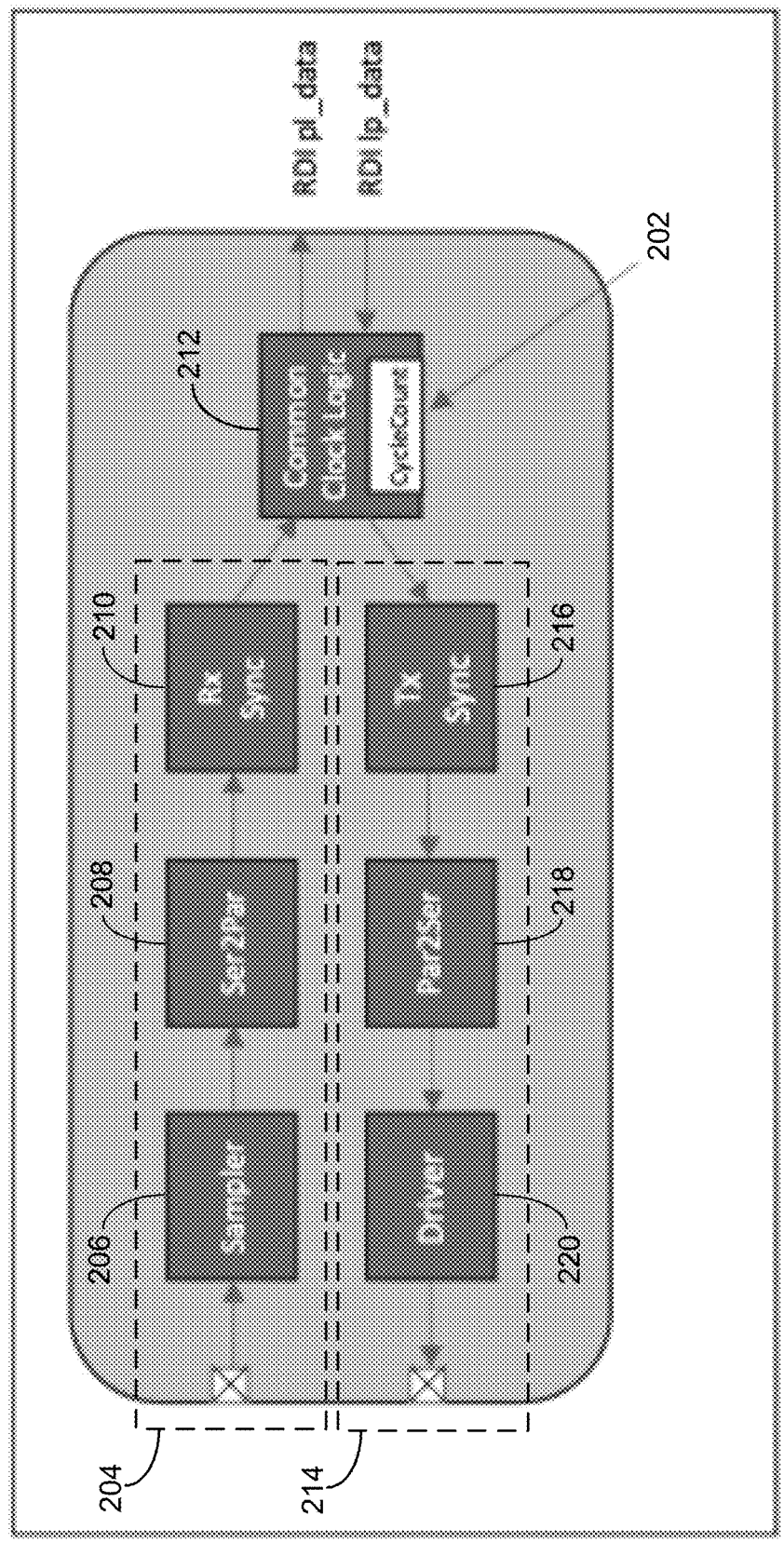
FIG. 2 illustrates one embodiment of respective receive and transmit pipelines coupled to common clock logic in the memory chiplet of FIG. 1.

FIG. 2 illustrates one embodiment of a pipeline architecture, generally designated 200, that includes a cycle counter 202 which may be employed by both the primary interface sub-circuit 114 and the secondary interface sub-circuit 124 to generate the clock cycle count to support synchronized transfers between the two interface sub-circuits 114 and 124 while employing dynamic bidirectional capability for the data links DATA1 and DATA2. For one embodiment, the pipeline architecture 200 includes a receive pipeline 204 that includes sampling circuitry 206 to sample signals received from the link partner interface. The sampled signals are then fed to deserialization circuitry 208 to deserialize the signals from a serialized stream to parallel signals. The parallel signals are then forwarded to a receive buffer 210 which is coupled to common clock logic 212 which includes the cycle counter 202. Running in a direction opposite to that of the receive pipeline 204, a transmit pipeline 214 includes a transmit buffer 216 coupled to the common clock logic 212. The transmit buffer feeds serialization circuitry 218 to serialize parallel signals from the transmit buffer 216 for transmission to the chiplet link partner by driver circuitry 220.

Figure 3:
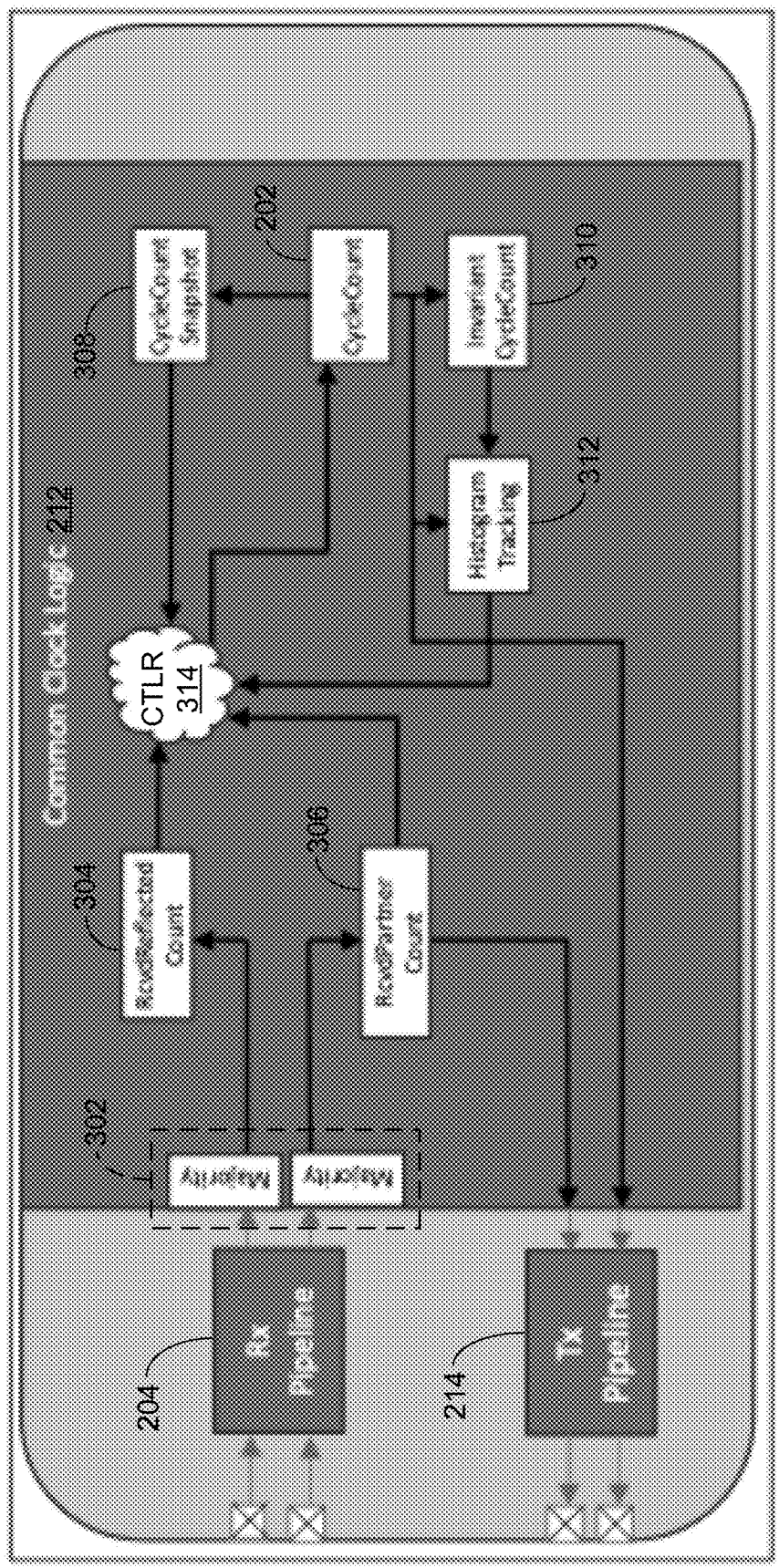
FIG. 3 illustrates further detail relating to the common clock logic shown in FIG. 2.

FIG. 3 illustrates an overall data path and associated logic for one specific embodiment of the common clock logic 212. The common clock logic 212 includes majority function logic 302 that performs a majority function on received pattern information (during a training procedure described more fully below). A first count register 304 stores a received reflected count that is received by the majority function logic 302. A second count register 306 stores a received partner count that is also received by the majority function logic 302. A third count register 308 stores a snapshot count value from the cycle counter 202. An invariant cycle counter 310 couples to the cycle counter 202. Histogram tracking logic 312 is coupled to the invariant cycle counter 310 and provides histogram information to controller logic 314.

Prior to operation, the multiple lanes 136 undergo a lane initialization or calibration sequence to deskew relative signal propagation times between the various lanes. The deskew process may take the form of one from a variety of methods, with the underlying goal to have all signals for a given clock cycle or unit interval (UI) of a given packet arrive at the intended receiver circuitry in a predetermined alignment.

Further referring to FIG. 3 and FIG. 4, following the lane training and word byte/alignment training, the cycle count value may be generated by carrying out a cycle count training process. The cycle count training process may be performed as a one-time procedure during an initialization mode of operation, or periodically during a run-time mode of operation. For one embodiment, the training process involves an initial coarse training sequence to generate a coarse calibrated value followed by a fine training sequence that further refines the coarse calibrated value into a finely tuned calibrated value.

To support the cycle count training process, the entire interface 108 is configured in a training mode of operation with sets of lanes associated with the ingress and egress lanes 140 and 138 designated for transferring specific patterns that include information regarding certain cycle counts. For example, in one embodiment, two specific training patterns are employed by each interface sub-circuit 114 and 124 for concurrent transmission along a certain number of lanes. One pattern may include a repeating 8-bit (byte) cycle count value, while the other pattern may include a repeating 8-bit received partner count value. Each pattern is sent across three lanes, for a total of six lanes in each direction. Comma values may be spaced every thirty-two repetitions of the count values.

Referring now to FIG. 4, for one embodiment, the coarse training sequence starts with the primary interface sub-circuit 114 sending a start event, at 402, to the secondary interface sub-circuit 124 via a write transaction executed by the sideband link 146. The write transaction essentially serves as a command for the secondary interface sub-circuit 124 to begin its cycle count training sequence. The primary interface sub-circuit 116 then starts its own cycle count training sequence, at 404. At the start of the cycle count training sequence, each interface sub-circuit, or "PHY", at 406, sets its own cycle counter to zero, and begins transmitting the first pattern (which includes that PHY's cycle count value) along a first set of three lanes, and the second pattern (which includes the other PHY's cycle count value) along a second set of three lanes. During the initial clock cycles of the training sequence, the received partner count value will be zero for several clock cycles until a count is received from the other PHY. As the training sequence progresses, real-time count value updates are made to the patterns.

With the patterns running, on the receive path of each PHY, two values will be available for the common clock logic 212, the received partner count value from the remote PHY, stored in the second register 306 of the common clock logic 212, and the local PHY's forwarded cycle count value, known as the received reflected count value, from the first register 304 of the common clock logic 212, after undergoing a full round trip of delay. Once a valid received reflected count value is received on the forwarded channel, at 408, the common clock logic 212 for that chiplet immediately creates a snapshot copy of its own cycle count value, known as a cycle count snapshot, and loads the value into the third register 308 of the common clock logic 212, AT 410. The cycle count snapshot thus represents the number of clock cycles that it took for the forwarded cycle count value to propagate to the partner chiplet and back, representing a round-trip propagation delay. At the secondary interface sub-circuit 124, the common clock logic 212 periodically compares, at 412, whether half the difference between the received reflected count value and the cycle count snapshot matches the difference between the received partner count and the cycle count snapshot. If the comparison results in a non-match, then the common clock signal fed to the common clock logic should be incrementally delayed or advanced by a delay circuit, at 414, to reduce the cycle count by at least one clock cycle for a subsequent comparison. The comparison and adjustment steps are iterated until the comparison results in a match, at 412.

Once the comparison operation results in a consistent matching condition, the cycle count training sequence ends the coarse training sequence, and begins the fine training sequence with a series of steps shown in FIG. 5. The fine training sequence begins, at 502, by setting a fine tune counter to 20479 (in terms of system clock cycles), such that it counts down to zero, defining a fine count interval. At the start of the fine tune count interval, the invariant cycle count counter will be loaded from the cycle count counter, at 504. The invariant cycle count will free-run from this point on and will not be subject to any incrementing or decrementing adjustments. Based on the timing difference between the cycle count and the invariant cycle count, a histogram is created, at 506, that counts the number of cycles where the timing difference is equal to 0, +1, −1, +2, −2, and Other.

Further referring to FIG. 5, once the fine tune count interval ends, a delay will be applied to the system clock such that the cycle count for the secondary interface sub-circuit is adjusted, at 508, to coincide with the median of the histogram. No further adjustments are made. If any samples of the histogram corresponded to the "Other" category, at 510, then the fine tune sequence has failed, and a new sequence initiated, at 502. If the sequence consistently fails, then an error condition is generated and sent to the primary interface sub-circuit 114. If the sequence succeeds, then the training sequence ends, at 512, and the interface 108 placed into a runtime mode of operation.

During runtime operation, the data links may be selectively switched to transfer data in either direction to allow for optimized traffic conditions. For some embodiments, the data traffic conditions may be additionally optimized through use of a flow control process that regulates packet transfers to prevent buffer circuits at each end of the links from overflowing or starving while at the same time optimizing the filling of the buffer circuits to reduce latency. For one embodiment, a credit-based flow control system is employed that employs credit counters in each chiplet. The use of such counters provides a predictive indication of the buffer usage at the other end of the link, without the need to wait for an actual acknowledgment that a given packet was received. As one example, where the memory chiplet 106 has a maximum buffer space, during the initialization mode, the buffer space may be advertised to the host IC chiplet 104. In response, the host IC chiplet may configure a credit counter with a number of "credits" that correspond to the available buffer space of the memory chiplet 104. Having a positive count of credits in the credit counter provides an indication to a transmitter in the host IC chiplet 104 that the destination receiver has room for additional data. As packets are sent to the destination receiver, the credit counter may decrement to account for the reduced buffer availability. A value of "0" generally corresponds to no availability in the buffer. When the packets are received and validated at the destination, the memory chiplet 106 may send a response packet confirming receipt of the packets. The credit counter at the host IC chiplet 104 may then increment the count back up once receiving the response packet.

While the dynamic bidirectional switching, cycle count, and flow control circuitry and techniques described above cooperate to maximize arbitration efficiency with minimal latency, further improvements may be realized by including the ability to dispatch partial transfers between the host IC chiplet 104 and the memory chiplet 106, and reassembling the partial transfers into a whole transfer at the receiving end. For one embodiment, this may be accomplished by using the lane allocation circuitry 128 to tap into the read and write pipeline information and identify potential intervals or "holes" along a given link where a full or partial cacheline of data may be inserted for transfer. This allows for maximizing the transfer efficiency of the link by fully packing the pipeline of interest with data. Partial transfers may be tracked through use of tag information that may be included in packet fields. For one embodiment, the tag information for multiple partial packet payloads is unique, allowing for reassembly of the partial payloads into a full payload, such as an entire cacheline of data, at the receiving end of the link. The lane allocation circuitry 128 may also include logic to allocate lane availability based on one or more prioritization schemes.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A chiplet-based multi-chip module (MCM) to couple to a base substrate, comprising:
   a package substrate that is separate from the base substrate;
   a host integrated circuit (IC) chiplet coupled to the package substrate and comprising:
   at least one processing element;
   a primary memory interface to transfer memory information from the at least one processing element via a communications fabric;
   a memory chiplet comprising:
   a secondary memory interface coupled to the primary memory interface via multiple data lanes;
   a memory port comprising a memory physical interface to access memory storage; and
   link directional control circuitry to select, for a first memory transaction, a first subset of the multiple data lanes to transfer data between the host IC chiplet and the memory chiplet.

2. The chiplet-based MCM of claim 1, wherein the memory chiplet further comprises:
   a read data pipeline; and
   wherein the link directional control circuitry selects the first subset of the multiple data lanes based on usage information relating to the read data pipeline.

3. The chiplet-based MCM of claim 1, wherein the memory chiplet further comprises:
   a write data pipeline; and
   wherein the link directional control circuitry selects the first subset of the multiple data lanes based on usage information relating to the write data pipeline.

4. The chiplet-based MCM of claim 3, wherein:
   the usage information relating to the write data pipeline comprises difference information between received write data requests and received write data corresponding to the received write data requests.

5. The chiplet-based MCM of claim 1, wherein:
   the link directional control circuitry is to select, for a memory write operation following a memory read operation, the first subset of the multiple data lanes to receive write data from the host IC chiplet.

6. The chiplet-based MCM of claim 1, wherein:
   the link directional control circuitry is to select, for a memory write operation performed concurrent with a memory read operation, a second subset of the multiple data lanes to receive write data from the host IC chiplet.

7. The chiplet-based MCM of claim 1, wherein:
   the multiple data lanes comprise multiple bidirectional data lanes.

8. The chiplet-based MCM of claim 1, wherein:
   the multiple data lanes corresponds to a full set of memory channels associated with the memory chiplet.

9. The chiplet-based MCM of claim 1, wherein:
   the secondary memory interface and the memory port of the memory chiplet are formed in a base die; and
   the memory storage comprises at least one memory die stacked on the base die.

10. The chiplet-based MCM of claim 1, wherein:
    the memory storage comprises high bandwidth memory (HBM), double-data rate (DDR) memory, low-power double-data rate (LPDDR) memory or graphics double-data rate (GDDR) memory.

11. A memory chiplet, comprising:
    at least one memory die;
    memory control circuitry coupled to the at least one memory die;

an interface circuit comprising multiple input/output (I/O) circuits to couple to a host IC chiplet via multiple data lanes; and link directional control circuitry to select, for a first memory transaction, a first subset of the multiple data lanes to transfer data between the memory chiplet and the host IC chiplet.

12. The memory chiplet of claim 11, further comprising:
a read data pipeline; and
wherein the link directional control circuitry selects the first subset of the multiple data lanes based on usage information relating to the read data pipeline.

13. The memory chiplet of claim 11, further comprising:
a write data pipeline; and
wherein the link directional control circuitry selects the first subset of the multiple data lanes based on usage information relating to the write data pipeline.

14. The memory chiplet of claim 13, wherein:
the usage information relating to the write data pipeline comprises difference information between received write data requests and received write data.

15. The memory chiplet of claim 11, wherein:
the link directional control circuitry is to select, for a memory write transaction following a memory read operation, the first subset of the multiple data lanes to receive write data from the host IC chiplet.

16. The memory chiplet of claim 11, wherein:
the link directional control circuitry is to select, for a memory write operation performed concurrent with a memory read operation, a second subset of the multiple data lanes to receive write data from the host IC chiplet.

17. The memory chiplet of claim 11, wherein:
the multiple I/O circuits comprise multiple bidirectional I/O circuits.

18. The memory chiplet of claim 11, wherein:
the interface circuit and the memory control circuitry of the memory chiplet are formed in a base die; and
the at least one memory die is stacked on the base die.

19. The memory chiplet of claim 18, wherein:
the at least one memory die comprises high bandwidth memory (HBM), double-data rate (DDR) memory, low-power double-data rate (LPDDR) memory or graphics double-data rate (GDDR) memory.

20. A host integrated circuit (IC) chiplet, comprising:
at least one processing element;
a communications fabric switchably coupled to the at least one processing element; and
a primary memory interface to transfer memory information from the at least one processing element via the communications fabric, the primary memory interface comprising
  data input/output (I/O) circuitry to couple to a memory chiplet via multiple data lanes; and
  link directional control circuitry responsive to control information from the memory chiplet to configure, for a first memory transaction, a first subset of the data I/O circuitry corresponding to a first subset of the multiple data lanes to transfer data between the host IC chiplet and the memory chiplet.

* * * * *